United States Patent
Van Der Zande-De Maertelaere et al.

(10) Patent No.: US 9,023,942 B2
(45) Date of Patent: May 5, 2015

(54) AQUEOUS COATING COMPOSITION AND PREPARATION THEREOF

(75) Inventors: Anna Johanna Van Der Zande-De Maertelaere, Bergen Op Zoom (NL); Dirk Emiel Paula Mestach, Nijlen (BE)

(73) Assignee: Nuplex Resins B.V., Bergen Op Zoom (NL)

( * ) Notice: Subject to any disclaimer, the term of this patent is extended or adjusted under 35 U.S.C. 154(b) by 317 days.

(21) Appl. No.: 13/011,961

(22) Filed: Jan. 24, 2011

(65) Prior Publication Data

US 2011/0124795 A1 May 26, 2011

Related U.S. Application Data

(63) Continuation of application No. PCT/EP2009/059554, filed on Jul. 24, 2009.

(30) Foreign Application Priority Data

Jul. 24, 2008 (GB) .................................. 0813548.5

(51) Int. Cl.
| | | |
|---|---|---|
| *C08G 18/08* | (2006.01) | |
| *C08G 18/28* | (2006.01) | |
| *C08J 3/00* | (2006.01) | |
| *C08K 5/34* | (2006.01) | |
| *C08K 5/3477* | (2006.01) | |
| *C08L 75/00* | (2006.01) | |
| *C08K 5/3492* | (2006.01) | |
| *C08K 5/00* | (2006.01) | |
| *C08K 5/24* | (2006.01) | |
| *C08J 3/24* | (2006.01) | |
| *C08K 3/00* | (2006.01) | |
| *C08K 5/21* | (2006.01) | |
| *C08K 3/20* | (2006.01) | |
| *C08J 3/03* | (2006.01) | |
| *C08L 21/02* | (2006.01) | |
| *C08L 33/10* | (2006.01) | |
| *C08L 67/08* | (2006.01) | |
| *C08L 33/08* | (2006.01) | |

(Continued)

(52) U.S. Cl.
CPC ............ *C08K 5/34924* (2013.01); *C08K 5/0025* (2013.01); *C08K 5/24* (2013.01); *C08J 3/24* (2013.01); *C08K 3/0033* (2013.01); *C08K 5/21* (2013.01); *C08K 3/20* (2013.01); *C08J 3/03* (2013.01); *C08J 2375/02* (2013.01); *C08J 2333/10* (2013.01); *C08J 2300/106* (2013.01); *C08J 2325/08* (2013.01); *C08J 2367/08* (2013.01); *C08J 2333/08* (2013.01); *C08J 2375/04* (2013.01); *C08L 21/02* (2013.01); *C08L 33/10* (2013.01); *C08L 67/08* (2013.01); *C08L 33/08* (2013.01); *C08K 2201/00* (2013.01); *C08L 75/02* (2013.01); *C08L 75/04* (2013.01); *C08L 25/08* (2013.01); *C08L 2312/00* (2013.01); *C09D 201/025* (2013.01); *C09D 167/08* (2013.01); *C09D 175/02* (2013.01); *C08G 18/791* (2013.01); *C08L 2201/54* (2013.01); *C09D 133/08* (2013.01); *C09D 133/10* (2013.01); *C09D 125/08* (2013.01); *C08G 18/0866* (2013.01); *C08G 18/62* (2013.01); *C08G 18/706* (2013.01); *C08G 18/792* (2013.01); *C09D 5/04* (2013.01); *C09D 15/00* (2013.01); *C09D 175/04* (2013.01)

(58) Field of Classification Search
CPC .......... C08J 3/03; C08J 3/24; C08J 2300/106; C08J 2325/08; C08J 2333/08; C08J 2333/10; C08J 2367/08; C08J 2375/02; C08J 2375/04; C08K 3/0033; C08K 3/20; C08K 5/0025; C08K 5/21; C08K 5/24; C08K 5/34924; C08K 2201/00; C08L 21/02; C08L 25/08; C08L 33/08; C08L 33/10; C08L 67/08; C08L 75/02; C08L 75/04; C08L 2201/54; C08L 2312/00; C08G 18/0866; C08G 18/62; C08G 18/706; C08G 18/791; C08G 18/792; C09D 5/04; C09D 15/00; C09D 125/08; C09D 133/08; C09D 133/10; C09D 167/08; C09D 175/02; C09D 175/04; C09D 201/025
USPC .......... 524/101, 507, 589, 590, 591, 839, 840
See application file for complete search history.

(56) References Cited

U.S. PATENT DOCUMENTS

| | | | | |
|---|---|---|---|---|
| 4,540,734 | A * | 9/1985 | Short et al. ..................... | 524/507 |
| 4,677,028 | A * | 6/1987 | Heeringa et al. ............ | 428/422.8 |
| 6,730,740 | B1 * | 5/2004 | Mestach et al. ............... | 525/192 |

FOREIGN PATENT DOCUMENTS

| | | |
|---|---|---|
| EP | 0192304 A1 | 8/1986 |
| EP | 1048681 A2 | 11/2000 |
| EP | 1125949 A1 | 8/2001 |
| GB | 2237576 A | 5/1991 |
| WO | 9932522 A1 | 7/1999 |

(Continued)

OTHER PUBLICATIONS

International Search Report for PCT/EP2009/059554 (issued Dec. 11, 2009).

(Continued)

*Primary Examiner* — Patrick D Niland
(74) *Attorney, Agent, or Firm* — Minerva Rivero; David Owen; Hoyng Monegier LLP

(57) ABSTRACT

A process for the preparation of a thixotropic aqueous coating composition comprising the steps of: i) providing an aqueous dispersion of a binder system comprising carbonyl and hydrazide functional groups for crosslinking; and ii) reacting in the aqueous dispersion, an ether amine with a tris(isocyanate) isocyanurate to form a polyurea sag control agent.

17 Claims, No Drawings

(51) Int. Cl.

| | |
|---|---|
| C08L 75/02 | (2006.01) |
| C08L 75/04 | (2006.01) |
| C08L 25/08 | (2006.01) |
| C09D 201/02 | (2006.01) |
| C09D 167/08 | (2006.01) |
| C09D 175/02 | (2006.01) |
| C08G 18/79 | (2006.01) |
| C09D 133/08 | (2006.01) |
| C09D 133/10 | (2006.01) |
| C09D 125/08 | (2006.01) |
| C08G 18/62 | (2006.01) |
| C08G 18/70 | (2006.01) |
| C09D 5/04 | (2006.01) |
| C09D 15/00 | (2006.01) |
| C09D 175/04 | (2006.01) |

(56) References Cited

FOREIGN PATENT DOCUMENTS

| | | |
|---|---|---|
| WO | 2006074895 A1 | 7/2006 |
| WO | 2006075000 A1 | 7/2006 |
| WO | 2007000335 A1 | 1/2007 |
| WO | 2007131959 A1 | 11/2007 |
| WO | 2008030437 A2 | 3/2008 |
| WO | 2008030445 A1 | 3/2008 |

OTHER PUBLICATIONS

UKIPO Search Report for GB0813548.5 (issued Dec. 4, 2008).
Aramendia et al, Journal of polymer science, Part A: Polymer Chemistry 2004, 42, No. 17, p. 4202-4211.
Buckman et al. (paint and coatings Ind. (US) 2002, vol. 18 No. 10, 96 (12pp)).

* cited by examiner

AQUEOUS COATING COMPOSITION AND PREPARATION THEREOF

CROSS REFERENCE TO RELATED APPLICATIONS

This application is a continuation of PCT application number PCT/EP2009/059554 filed on 24 Jul. 2009, which claims priority from United Kingdom application number GB 0813548.5 filed on 24 Jul. 2008, the contents of both applications are hereby incorporated by reference in their entireties.

BACKGROUND OF THE INVENTION

1. Field of the Invention

This invention relates to a process for the preparation of an aqueous coating composition; an aqueous coating composition made by the process; a paint formulation; and an article coated with the coating composition or the paint formulation.

2. Description of the Related Art

The use of polymer coatings to protect surfaces, for example from moisture ingress, abrasion and erosion, and to enhance the aesthetic and functional properties of materials is known. These polymer coatings are typically applied to surfaces as liquid coating compositions using techniques such as rolling, brushing, sprinkling, casting and pneumatic or electrostatic spraying.

Often these coating compositions are adapted to exhibit rheological behaviour, that is they flow freely under high shear but are resistant to flowing when under low shear. In this manner the coating compositions have a consistency that is gel-like at rest, but fluid when agitated. This rheological behavior is referred to as thixotropy.

This thixotropic nature means that the coating compositions easily flow and level-out while under the forces associated with application to a surface, but resist the tendency to flow under lower shear forces such as gravity when applied to a vertical surface. This combines an easy applicability of the coating composition with a reduced tendency to sagging or dripping on vertical surfaces.

The use of rheology modification agents in conventional coating compositions to create a thixotropic profile and thus reduce sagging defects is widespread. Such rheology modification agents are commonly referred to as sag control agents.

The conventional thixotropic coating compositions have been predominantly based on solvent-borne polymer dispersions having high volatile organic compound (VOC) contents. For example, solvent-borne alkyds and oil-modified urethanes. A wide range of modifiers exist to impart the desired thixotropic behavior to such solvent-borne coating compositions, examples including modified inorganic clays and polyamide or polyurea modified alkyds.

Due to the need to reduce the emissions of VOCs into the earth's atmosphere, waterborne alternatives to the conventional solvent-borne alkyds and oil modified urethanes are needed. Waterborne thermoplastic vinyl polymer dispersions or thermoplastic waterborne polyurethane dispersions can be used in aqueous coating compositions but do not possess suitable performance properties such as chemical resistance, water resistance, blocking resistance and low temperature flexibility.

One particular group of water-borne polymer dispersions possessing a good combination of performance properties for use in aqueous coating compositions are those comprising carbonyl-hydrazide functional crosslinking systems. Examples of such compositions are described in patent applications U.S. Pat. No. 6,730,740 and EP1125949.

In U.S. Pat. No. 6,730,740, carbonyl-functional polymers are combined with polyfunctional hydrazide crosslinking agents in water-borne systems to form coating compositions having carbonyl-hydrazide crosslinking systems.

In such carbonyl-hydrazide crosslinking systems, crosslinking of the polymers takes place on drying through formation of a Schiff's base. Removal of water from the system, such as by evaporation during air drying, drives the reaction to the crosslinked product as illustrated in the below example scheme.

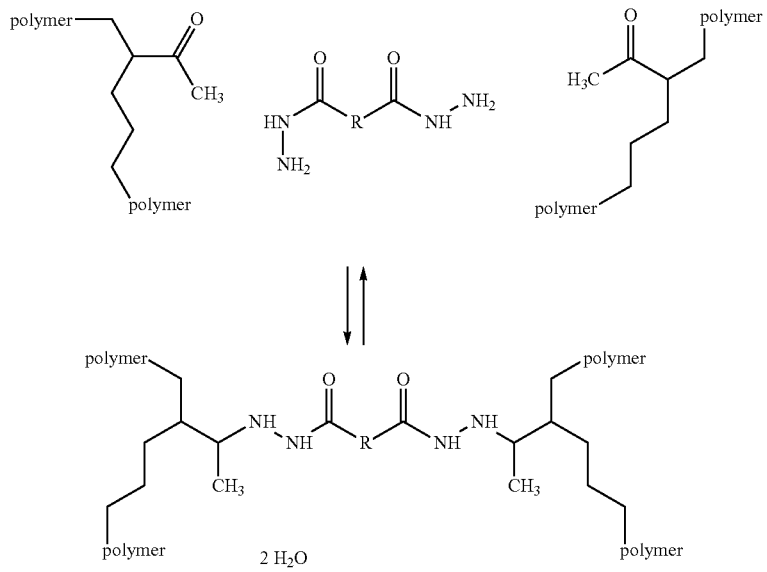

It is typical in aqueous coating compositions having carbonyl-hydrazide crosslinking systems that the carbonyl-functional groups are provided on the binder polymers, and the hydrazide-functional groups are provided on the crosslinkers. However, it is also possible that the carbonyl-functionality can be provided on the crosslinker and the hydrazide functionality can be provided on the binder polymer. Alternatively, both carbonyl and hydrazide functionality can be provided on the polymer binder allowing the molecules of the polymer binder to link directly to one another without the need for an additional crosslinker component.

Aqueous dispersions of coating compositions having carbonyl-hydrazide crosslinking systems provide useful aqueous coating compositions, and are desirable because of their low VOC requirements, and good performance properties.

However, obtaining the desired thixotropy in the aqueous coating compositions having carbonyl-hydrazide crosslinking systems is difficult using the commonly available sag control agents such as cellulosic ethers, alkali swellable acrylic polymers, hydrophobically modified alkali swellable thickeners or non-ionic associative thickeners. These thickeners provide pseudoplasticity rheology in a waterborne coating, in which viscosity decreases with increasing rate of shear (also termed shear thinning). Introducing pseudoplasticity, a decrease in viscosity over time at a constant shear rate is much more complex. Examples of thixotropic agents that can be used in waterborne paints to obtain such pseudoplasticity include fumed silicas and modified clays. However, the addition of these substances often has an adverse effect on coating properties such as gloss or film-clarity.

There is thus a need for sag control agents that show good results for aqueous coating compositions having carbonyl-hydrazide crosslinking systems.

WO 2008/030445 and WO 2008/030437 describe aqueous compositions of polyurea sag control agents obtained by reacting hydrophilic polyisocyanates with a primary amino-functional compound having at least one hydroxyl functional or ether group. The polyurea compounds are prepared directly in water, optionally containing a water-miscible organic solvent, and are then added to a coating composition. Alternatively they can be prepared "in-situ", in the presence of the binder and crosslinking system. The sag control agents of these patent applications are not disclosed for use with coating compositions having carbonyl-hydrazide crosslinking systems.

It is an object of the present invention to provide a sag control agent for aqueous coating formulations having carbonyl-hydrazide crosslinking systems, in particular the sag control agent being formed in situ with the carbonyl-hydrazide crosslinking system.

BRIEF SUMMARY OF THE INVENTION

The inventors have discovered that polyurea adducts of tris(isocyanate) isocyanurates and ether amines act as effective sag control agents for aqueous coating compositions comprising carbonyl and hydrazide crosslinking systems. The inventors have also discovered that such a polyurea adduct sag control agent can advantageously be formed in situ with (that is, in the presence of) carbonyl-hydrazide crosslinker systems to give products that give films with improved appearance that are free of gel-particles.

The polyurea adduct sag control agent is formed in situ with the carbonyl-hydrazide crosslinker system via reaction of one or more ether amines with one or more tris(isocyanate) isocyanurates to give a polyurea adduct or adducts.

It is surprising that it is possible to form the adduct of tris(isocyanate) isocyanurates and ether amines by reaction in the presence of crosslinking systems having carbonyl-hydrazide functionality. This is because the ether amine is highly reactive towards the carbonyl-functionality of the crosslinking system, and the isocyanates of the tris(isocyanate) isocyanurate are highly reactive towards the hydrazide functionality of the crosslinking system. Substantial reaction of the polyisocyanate isocyanurates and ether amines with the crosslinking system would thus be expected to lead to poor results.

According to the present invention there is provided a process for the preparation of a thixotropic aqueous coating composition comprising the steps of:
i) providing an aqueous binder system comprising a polymer binder and a carbonyl-hydrazide crosslinking system; and
ii) reacting in the aqueous binder system, an ether amine with a tris(isocyanate) isocyanurate to form a polyurea sag control agent.

According to a preferred embodiment of the present invention there is provided a process for the preparation of a thixotropic aqueous coating composition comprising the steps of:
i) providing an aqueous binder system comprising a dispersion of a polymer binder having carbonyl and/or hydrazide functional groups, and a crosslinker having carbonyl and/or hydrazide functional groups for reaction with the functional groups of the polymer binder to give crosslinking; and
ii) reacting in the aqueous binder system, an ether amine with an tris(isocyanate) isocyanurate to form a polyurea sag control agent.

In the reaction step the ether amine and the tris(isocyanate) isocyanurate are reacted to form their polyurea adduct.

As used herein the term 'ether amine' refers to ether compounds having a terminal primary amino group. The preferred ether amines are ether-monoamines. Examples of suitable ether-monoamines are polyether-monoamines, comprising a polyether backbone and a single terminal primary amine. Specific examples include the Jeffamine M™ products available from Huntsman Performance Products, USA.

Tris(isocyanate) isocyanurates are compounds having the chemical formula of the trimeric derivatives of diisocyanates.

Preferably the tris(isocyanate) isocyanurates are tris(isocyanate alkyl) isocyanurates, wherein preferably each isocyanate alkyl group independently comprises 5 to 14, more preferably 8-12 and most preferably 6 carbon atoms.

Preferably the tris(isocyanate) isocyanurates have the general formula:

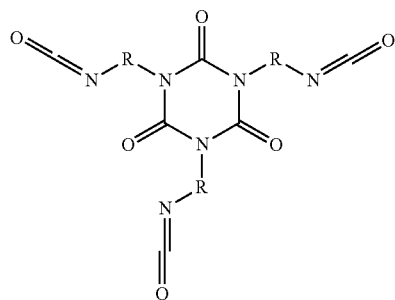

wherein R=$(CH_2)_n$ and n=5 to 14, preferably 8-12, most preferably 6.

Tris(isocyanate alkyl) isocyanurates can be conveniently prepared as the trimeric derivatives of diisocyanates. Preferred examples include the trimeric derivatives of one or more diisocyanates containing 5-14 carbon atoms, particularly one or more diisocyanates containing 8-12 carbon atoms. Most preferably the tri-isocyanate isocyanurate is the trimeric derivative of hexamethylene diisocyanate.

An aqueous coating composition, as referred to herein, means a composition comprising at least an aqueous dispersion of a polymer binder and optionally a crosslinker. Aqueous coating compositions typically contain between 15% and 90% by weight of water, based on the total weight of the composition. Preferably they contain 15% to 85%, more preferably 25 to 80%, and most preferably at least 40% by weight of water. They also typically contain less than 15% by weight of volatile organic compounds, based on the total weight of the coating composition. Preferably they contain less than 10%, more preferably less than 7% and most preferably less than 5% by weight of volatile organic compounds.

The desired degree of thixotropy may be obtained by employing the sag control agent in an amount of at least 0.01%, more preferably of at least 0.05%, even more preferably of at least 0.10%, and most preferably of at least 0.15%, and preferably of at most 30%, more preferably of at most 10%, even more preferably of at most 3%, and most preferably of at most 1.5%, based on the total weight of the coating composition.

In another embodiment, the aqueous coating composition according to the invention comprises 0.01% to 30%, more preferably 0.05% to 20%, even more preferably 0.10% to 10%, and most preferably 0.15% to 3% by weight of the polyurea sag control agent based on the total weight of the coating composition.

According to a second aspect of the invention there is provided an aqueous coating composition comprising, a) a binder system comprising carbonyl and hydrazide functional groups for crosslinking; b) a polyurea sag control agent; and c) water; wherein the polyurea sag control agent is a polyurea adduct of an ether amine and a tris(isocyanate) isocyanurate.

In a preferred embodiment of the invention there is further provided an aqueous coating composition comprising, a binder having carbonyl and/or hydrazide functional groups, optionally a crosslinker having carbonyl and/or hydrazide functional groups reactive with the functional groups of the binder to give crosslinking; a polyurea sag control agent; and water; wherein the polyurea sag control agent is a polyurea adduct of an ether amine and a tris(isocyanate) isocyanurate.

According to the invention there is still further provided a paint formulation comprising the coating composition and a colouring agent, for example a pigment.

The invention also provides an article coated with the coating composition or the paint formulation.

Polymer Binders

The polymer binders can be any water-dilutable polymer binder that comprises carbonyl functionality, hydrazide functionality or both carbonyl and hydrazide functionality. Preferably the polymer binder is provided with carbonyl functionality suitable for crosslinking reactions with hydrazide groups on a crosslinker.

Preferably the binders are vinyl polymers obtained by the polymerization of ethylenically unsaturated monomers. Other binders that can be used are urethane dispersions, urethane-acylic dispersions, alkyd emulsions or alkyd-acrylic dispersions Aqueous dispersions of carbonyl-functional vinyl polymers can be obtained by the polymerization of ethylenically unsaturated monomers via emulsion polymerization processes. The procedure for a free radical-initiated aqueous emulsion polymerization of monomers having at least one ethylenically unsaturated group has often been described in the past and is sufficiently well known to a person skilled in the art [cf. for example Encyclopedia of Polymer Science and Engineering, Vol. 8, page 659 et seq. (1987); D.C. Blackley, in High Polymer Latices, Vol. 1, page 35 et seq. (1966); H. Warson, The Applications of Synthetic Resin Emulsions, page 246 et seq., Chapter 5 (1972) and Emulsion Polymerization, Interscience Publishers, New York (1965), all aforementioned references are hereby incorporated by reference in their entireties].

The ethylenically-unsaturated emulsion-polymerizable monomers are preferably selected from the group consisting of a mono vinylidene aromatic monomer, an $\alpha$-$\beta$ ethylenically-unsaturated carboxylic acid ester monomer, a vinyl ester monomer, and various combinations of these.

Accordingly, preferred mono vinylidene aromatic monomers include styrene, $\alpha$-methyl styrene, vinyl toluene, o-, m- and p-methylstyrene, o-, m- and p-ethyl styrene and combinations thereof.

Preferred $\alpha$-$\beta$ ethylenically-unsaturated carboxylic acid ester monomers include methyl acrylate, ethyl acrylate, butyl acrylate, methyl methacrylate, butyl methacrylate, tertiary-butyl acrylate, 2-ethyl hexyl acrylate, and combinations of these.

Preferred vinyl ester monomers include vinyl acetate, vinyl esters of versatic acid such as the monomers commercialized by Shell Chemicals under the trade names VEOVA™ 9, 10 and 11), acrylonitrile, and combinations of these.

Carbonyl groups in the polymer are preferably derived from the incorporation of ethylenically unsaturated monomers having a carbonyl functional group. Particularly preferred monomers are ketone functional monomers such as the acetoacetoxy esters of hydroxyalkyl acrylates and methacrylates such as acetoacetoxyethyl methacrylate, and also keto-containing amides such as diacetoneacrylamide. Other monomers that can be used in the copolymerization to introduce these groups include, but are not limited to, (meth) acrolein, formyl styrol, diacetone acrylate, acetonitrile acrylate, diacetone methacrylate, 2-hydroxypropyl acrylate acetyl acetate, butanediol-1,4 acrylate acetyl acetate, or a vinyl alkyl ketone, e.g., vinyl methyl ketone, vinyl ethyl ketone or vinyl butyl ketone.

In addition the polymer can contain functionality other than carbonyl, for example carboxyl, sulphate or sulphonate, phosphate, hydroxyl, oxirane, secondary or tertiary amine, ethylene ureum or silane.

These functional groups are used to impart certain properties to the coating composition, such as stability, or to the coating formulated with the polymer dispersion, such as adhesion. The stability of the coating composition can be improved by the use of comonomers with hydrophilic groups such as acid or amide functions such as acrylamide and methacrylamide.

Other functional monomers that can be included to improve the adhesion of coatings containing formed from the coating composition comprise tertiary amino or ethylene ureido-functional monomers such as dimethylaminoethyl methacrylate and N-(2-methacryloyloxethyl)ethylene urea.

Examples of (meth)acrylic monomers used to introduce carboxyl-functionality are acrylic acid, methacrylic acid, itaconic acid and $\alpha$-carboxyethylacrylate. Also other olefinically unsaturated carboxyl bearing monomers can be used such as hemi-ester of maleic anhydride. Sulphonic acid-bearing monomers could also be used, such as styrene p-sulphonic acid. An acid bearing monomer could be polymerized as the free acid or as a salt, e.g. the $NH_4$ or alkali metal salts of ethylmethacrylate-2-sulphonic acid or 2-acrylamido-2-methylpropane sulphonic acid, or the corresponding free acids.

Examples of monomers used to introduce hydroxyl functionality are acrylate esters having a hydroxyl group such as hydroxyethyl methacrylate, hydroxyethyl acrylate, hydroxypropyl acrylate, hydroxypropyl methacrylate, hydroxybutyl acrylate. Also monomers having latent hydroxyl groups such as glycidyl methacrylate can be used.

When forming the vinyl polymers by emulsion polymerization, the monomer mixture may be added neat or as an emulsion in water. The monomer mixture may be added in one or more additions or continuously, linearly or not, over the reaction period, or combinations thereof.

The monomeric mixture can, if desired, include an optional chain-transfer agent (or more than one optional chain-transfer agent) as well as minor amounts of monomers having more than one ethylenically-unsaturated bond.

Either thermal or redox initiation processes may be used to start the emulsion polymerization. The reaction temperature is typically maintained at a temperature lower than 100° C. throughout the course of the reaction. Preferred is a reaction temperature between 30° C. and 95° C., more preferably between 50° C. and 90° C.

When forming the polymer dispersions conventional free radical initiators may be used such as, for example, hydrogen peroxide, sodium peroxide, potassium peroxide, t-butyl or t-amyl hydroperoxide, cumene hydroperoxide, ammonium and/or alkali metal persulphates, sodium perborate, perphosphoric acid and salts thereof, potassium permanganate, and ammonium or alkali metal salts of peroxydisulphuric acid, typically at a level of 0.01% to 3.0% by weight, based on the weight of total monomer. Redox systems using the same initiators as oxidizers are coupled with suitable reducing agents such as, for example, sodium formaldehyde sulphoxylate, ascorbic acid, isoascorbic acid, alkali metal and ammonium salts of sulphur-containing acids, such as sodium sulphite, bisulphite, thiosulphate, hydrosulphite, sulphide, hydrosulphide or dithionite, formamidine sulphinic acid, hydroxymethanesulphonic acid, sodium 2-hydroxy-2-sulphinatoacetic acid, acetone bisulphite, amines such as ethanolamine, glycolic acid, glyoxylic acid hydrate, lactic acid, glyceric acid, malic acid, tartaric acid and salts of the preceding acids may be used. Redox reaction catalyzing metal salts of such as those of iron, copper, manganese or cobalt may be used.

In the production of polymer dispersions by means of the emulsion polymerization process surface active agents are commonly used. These surface active agents or surfactants form micelles that serve as loci for the particle nucleation and help to stabilize the growing polymer particles during the emulsion polymerization. Surfactants also stabilize the polymer dispersion after it has been synthesized. Conventional surfactants may be used such as, for example, anionic and/or nonionic emulsifiers such as, for example, alkali metal or ammonium salts of alkyl, aryl, or alkylaryl sulphates, sulphonates or phosphates, alkyl sulphonic acids, sulphosuccinate salts, fatty acids and ethoxylated alcohols or phenols. The amount of surfactant used is usually 0.1% to 6% by weight, based on the weight of monomer.

The presence of surfactants in a polymer dispersion, however, always contributes to a certain degree of water-sensitivity in the final film formed from the dispersion. Therefore surfactants that contain an ethylenically unsaturated bond that allows them to participate during the emulsion polymerization are sometimes used. These surfactants, sometimes referred to as polymerizable surfactants become part of the polymer backbone and impart less water-sensitivity to the final polymer film. Examples of polymer dispersions prepared using polymerizable surfactants can be found in WO1999032522 A1, EP1125949 A1 and Aramendia et al. Journal of Polymer Science, Part A: Polymer Chemistry 2004, 42, No. 17, p. 4202-4211, all references hereby incorporated by reference in their entireties. Suitable polymerizable surfactants include hemi-esters of maleic anhydride of the formula $M^+.^-OOC-CH=CHCOOR$ wherein R is C(6-22) alkyl and $M^+$ is $Na^+$, $K^+$, $Li^+$, $NH_4^+$, or a protonated or quaternary amine. Polyoxyethylene alkylphenyl ethers with an ethylenically unsaturated bond sold under the tradename Noigen® RN (ex Montello, Inc.) such as NOIGEN RN-10™, NOIGEN RN-20, NOIGEN RN-30, NOIGEN RN-40™, and NOIGEN RN-5065™ or the sulphate thereof sold under the tradename Hitenol® BC (ex Montello, Inc.) such as HITENOL BC-10™, HITENOL BC-1025™, HITENOL BC-20™, HITENOL BC-2020™, HITENOL BC-30™.

MAXEMUL™ 6106 (available from Uniquema), which has both phosphonate ester and ethoxy hydrophilicity, a nominal $C_{18}$ alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Croda Industrial Specialties). Alternative reactive surfactants suitable for use with various embodiments of the present invention include sodium allyloxy hydroxypropyl sulphonate (available from Rhodia as SIPOMER COPS-1™) ADEKA REASOAP SR/ER series such as ADEKA REASOAP ER-10, ER-20, ER-30 and ER-40, Akeda Reasope SR-10, SR-20, SR-30 (all available from Asahi Denka Co., Ltd.) and allylsulphosuccinate derivatives (such as TREM LT-40™ (available from Henkel)).

Another way of stabilizing aqueous polymer dispersions is by the use of surface active oligomers or polymers. Most of the time these oligomers are characterized by relatively high acid values (e.g. 200 mg KOH/g). Most frequently additional low molecular weight surfactants have to be used for control of particle size/number. Useful acrylic polymers are commercially available under the trade name "JONCRYL" from BASF. Examples are JONCRYL 67, JONCRYL 586, JONCRYL 611, JONCRYL 678, JONCRYL 680, JONCRYL 682, JONCRYL 683, JONCRYL 690, and JONCRYL 693 which are styrene acrylic resins having 98% nonvolatile and 2% by weight volatile organic compounds, and are available in the form of clear flakes. Other commercially available polymers include CRAYMUL 8450, CRAYMUL 8460 from Cook Composites and Polymers.

Recently, low-acid value oligomers have been described for example by Buckmann et al. (Paint & Coatings Ind. (US) 2002, Vol 18 No 10, 96 (12 pp) hereby incorporated by reference in its entirety) that are used as stabilizers during the emulsion polymerization. These oligomeric surfactants are acrylic polymers with a number average molecular weight, Mn, of about 5000 and an acid value of 50-100 mg KOH/g. Optionally, these oligomers may have crosslinking functionality such as carbonyl or hydroxyl groups or contain sites for grafting (coming for example from allylmethacrylate). These oligomers can be used as sole stabilizers in an emulsion polymerization (so without the use of additional conventional surfactant).

In one embodiment, the polymer binder according to the invention has a number average molecular weight in the range of 500 and 250000, preferably 1000 to 50000, and more preferably 2000 to 20000.

Crosslinkers

The polymer binders having carbonyl or hydrazide functionality are mixed with crosslinkers having carbonyl or hydrazide functionality to form aqueous binder systems having carbonyl-hydrazide crosslinking systems.

The binder system can be obtained by simply blending the crosslinkers into the a dispersion of the polymer binders. The resulting binder system is functional for crosslinking, having a carbonyl-hydrazide crosslinking system.

The crosslinker carries functional groups reactive with the crosslinking groups provided on the polymer binder. Preferably the polymer binder is provided with carbonyl functional groups and the crosslinker is provided with hydrazide functional groups. A hydrazide functional crosslinker is a compound bearing a carbonyl-reactive functional group of formula —NHNH$_2$ and also a carbonyl-reactive hydrazone group derived from such a group by reaction with a monoketone or monoaldehyde of at least two carbon atoms. It will be apparent that such functional groups are usually part of larger molecules, such as —R—C(=O)—NH—NH$_2$, —R—C (=O)—NH—N=C<, —R—NH—C(=O)NH—NH$_2$, —R—NH—C(=O)—NH—N=C<, and —R—NH—NH$_2$ where R is alkyl, substituted alkyl, substituted alicyclic, or substituted aryl.

More preferably the hydrazide-functional crosslinker is a dihydrazide or a bis-hydrazones, e.g., a dicarboxylic acid dihydrazide such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, phthalic acid dihydrazide, or terephthalic acid dihydrazide, cyclohexane dicarboxylic acid bis-hydrazide, azelaic acid bis-hydrazide; also carbonic acid hydrazides, bis-semicarbazides, trihydrazides, dihydrazinoalkones and dihydrazines of aromatic hydrocarbons, for example 1,4-dihydrazinobenzene and 2,3-dihydrazinonophthalene, dihydrazine and others known in the art.

Alternatively, the cross-linking agent can be a water-soluble aliphatic dihydrazine, such as ethylene-1,2-dihydrazine, propylene-1,3-dihydrazine, and butylene-1,4-dihydrazine, or a polyamine such as isophorone diamine or 4,7-dioxadecane-1,10-diamine.

Preferably, the cross-linking agent is adipic dihydrazide.

Aqueous Binder Systems with Polymer Binder and Carbonyl-Hydrazine Crosslinking System Suitable carbonyl functional aqueous polymer binder dispersions containing a di- or poly-hydrazide crosslinker are commercially available under the trade names Setaqua 6756™ and Setaqua 6778™ (available from Nuplex Resins), NeoCryl XK-98™ (available from DSM NeoResins+), VIACRYL VSC 6286w/45WA™ and VIACRYL VSC 6295w/45WA™ (available from Cytec), Acronal A-603™ and Acronal A-627™ (available from BASF).

Modification with Sag Control Agent

The aqueous binder systems described above are modifiable with polyurea adduct sag control agents in accordance with the method of the invention.

The reaction of the ether amine and tris(isocyanate) isocyanurate is preferably carried out at a temperature between 5 and 80° C., preferably between 10 and 60° C., and most preferably between 20 and 40° C.

In the process, the ether amine and the tris(isocyanate) isocyanurate can be added consecutively to the resin, either component being added first; or they may be added simultaneously. Preferably, the ether amine is added prior to the addition of the tris(isocyanate) isocyanurate.

In the reaction between the ether amine and the tris(isocyanate) isocyanurate for the preparation of the polyurea adduct either the ether amine or the tris(isocyanate) isocyanurate may be used in excess relative to the stoichiometric amount. The ratio, however, is preferably 1:1.

In a preferred embodiment the process comprises the steps of:

a. providing an aqueous coating composition comprising a carbonyl-hydrazide functional crosslinking system;

b. adding to the composition an ether amine, preferably under stirring;

c. adding a tris(isocyanate) isocyanurate to the mixture of the aqueous polymer dispersion, preferably under stirring; and d. reacting the ether amine with the tris(isocyanate) isocyanurate to give a polyurea adduct sag control agent.

Tris(isocyanate) isocyanurates

Tris(isocyanate) isocyanurates are compounds having the chemical formula of the trimeric derivatives of diisocyanates.

Preferably the tris(isocyanate) isocyanurates are tris(isocyanate alkyl) isocyanurates or tris(isocyanate cyclo alkyl) isocyanurates, wherein preferably each isocyanate alkyl group independently comprises 5 to 14, more preferably 8-12 and most preferably 6 carbon atoms.

Preferably the tris(isocyanate) isocyanurates have the general formula:

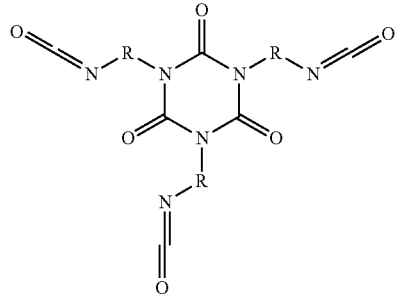

wherein R=(CH$_2$)$_n$ and n=5 to 14, preferably 8-12, most preferably 6.

Preferably the tris(isocyanate) isocyanurate to be used for the preparation of the sag control agent is formed as the trimer of one or more diisocyanates containing 5-14 carbon atoms, particularly one or more diisocyanates containing 8-12 carbon atoms. Most preferably the tris(isocyanate) isocyanurate is formed from hexamethylene diisocyanate.

Non-limiting examples of suitable diisocyanates are: methylene diisocyanate, trimethylene diisocyanate, tetramethylene diisocyanate, hexamethylene diisocyanate, cyclohexyl-1,4-diisocyanate, dicyclohexylmethane-4,4'-diisocyanate, dicyclohexyldimethylmethane-4,4'-diisocyanate, 2,4-toluene diisocyanate, 2,6-toluene diisocyanate and diphenylmethane-4,4'-diisocyanate, 3-isocyanatomethyl-3,5,5-trimethylcyclohexylisocyanate (isophorone diisocyanate).

The tris(isocyanate) isocyanurate may be a trimer formed from three of the same diisocyanate molecules), or may also be formed from 2 or 3 different diisocyanates. Optionally, use may be made of mixtures of diisocyanates taken from the different groups of the diisocyanates referred to above.

The tris(isocyanate) isocyanurate may optionally be modified to be hydrophilic, for example by modification with at least one non-ionic or anionic hydrophilic group. Water-soluble or water-dispersible polyisocyanates are obtainable, for example, by modification with carboxylate, sulphonate and/or polyethylene oxide groups and/or polyethylene oxide/polypropylene oxide groups. A hydrophilization of the polyisocyanates is possible, for example by reaction with deficit quantities of monohydric, hydrophilic polyether alcohols.

The preparation of such hydrophilized polyisocyanates is described, for example, in EP-A 0 540 985, p. 3, line 55-p. 4, line 5. Examples of the above-mentioned polyisocyanate dispersed in water may include Bayhydur VPLS-2032™, Bayhydur VPLS-2319™, Bayhydur 3100™, Bayhydur VPLS-2336™, and VPLS-2150/1™ (available from Bayer), Rhodocoat™ WAT, Rhodocoat™ WAT-1, Rhodocoat™ WT 2102, Rhodocoat™ X EZ-D™ 401, Rhodocoat™ X EZ-D™ 803, Rhodocoat™ X EZ-M™ 501, Rhodocoat™ X EZ-M™ 502, Rhodocoat™ X WAT-3, Rhodocoat™ X WAT-4 (available from Rhodia)

Optionally, mixtures of tris(isocyanate) isocyanurates may be used.

Ether Amines

The following are examples of representative ether amines for use in the invention: (cyclo)alkoxy(cyclo)alkyl monoamines, mono(cyclo)alkoxy arene amines, poly(cyclo)alkoxy arene amines, areneoxy(cyclo)alkoxy amines, aryloxy(cyclo)alkyl amines, areneoxyarene amines, aryloxyaryl amines. The ether amines may optionally contain one or more hydroxyl groups. The ether amines preferably do not contain more than 55 carbon atoms, and preferably have only 1-24 and more particularly 1-12 carbon atoms.

Specific examples of suitable ether amines include: 2-methoxyethylamine, 2-ethoxyethylamine, 3-methoxy-1-propylamine, 1-methoxymethylpropylamine, 1,1-dimethoxy-2 propylamine, 3-ethoxy-1-propylamine, 3-butoxy-1-propylamine, 3-(2-ethylhexyloxy)-1-propylamine, 3-tridecyloxypropylamine, 3-stearyloxypropylamine, p-methoxybenzylamine, 3,4-dimethoxybenzylamine, p-methoxyphenylethylamine, 3,4-dimethoxyphenyl-ethylamine, 9-phenoxy-4,7-dioxanon-1-amine, 2-methyl-4-methoxyaniline, 2,5-dimethoxy-aniline, furfurylamine, tetrahydrofurfurylamine, 2-(4-morpholinyl)ethylamine, 4-(3-aminopropyl)morpholine, 2,2'-aminoethoxyethanol, 4,7-dioxadecane-1,10-diamine, 4,9-dioxadecane-1,12-diamine, 7-methyl-4,10-dioxamidecane-1,13-diamine, 4,7,10-trioxamidecane-1,13-diamine and bis(3-aminopropyl)polytetrahydrofuran having a molecular weight of about 750.

Polyether amines useable in the present invention are available under the tradename Jeffamine M™, (from Huntsman Performance Products, USA). Jeffamine M 600™ for example is a polypropylene glycol monoamine, with methoxyethyl termination, and an approximate molecular weight of 600. Other types include Jeffamine M-1000™ (approx. MW 1000), Jeffamine M-2005™ (approx. MW 2000), Jeffamine M-2070™ (approx. MW 2000).

The most preferred ether amine is 3-methoxy-1-propyl amine.

Mixtures of the ether amines referred to above are also useable.

Additional Components of Aqueous Coating Compositions

The aqueous coating compositions may further comprise additional rheology modifiers; coalescents; solvents; biocides; wetting agents; defoamers; dyes; humectants; waxes; surfactants; fillers or extenders; colorants; flatting agents; neutralizers; buffers; freeze-thaw additives; plasticizers; antifoaming agents; tackifiers; hindered amine light stabilizers; UV absorbers such as benzophenone, substituted benzophenones, and substituted acetophenones; dispersants; antioxidants and pigments.

Examples of suitable pigments and extenders include titanium dioxide such as anatase and rutile titanium dioxides; zinc oxide; antimony oxide; iron oxide; magnesium silicate; calcium carbonate; organic and inorganic colored pigments; aluminosilcates; silica; various clays such as kaolin and delaminated clay; and lead oxide.

Volatile organic components (VOC) may be added to a paint or coating to improve the film properties or to aid in the application properties. Examples of suitable VOC are glycol ethers, organic esters, aromatic compounds, ethylene and propylene glycol, and aliphatic hydrocarbons.

The inventive aqueous compositions are particularly useful in the formation of compositions for protective and decorative finishes, such as, water repellants; semi-transparent stains; clear varnishes; or solid color stains, for use on wood substrates. These wood substrates include wood, weathered or not, that has not been previously treated with a protective composition, and treated wood where a previous treatment has been degraded upon weathering.

EXAMPLES

Example 1

Acrylic Dispersion Modified with 3% Polyurea (on Solids)

2000 grams of Setaqua 6756™ (a commercially available carbonyl-functional acrylic polymer dispersion containing a dihydrazide crosslinker with a solid content of 40±1%, available from Nuplex Resins) were weighed into a 5 liter flask equipped with an anchor stirrer. The contents were heated to 35° C. while stirring at 200 rpm. 8.5 grams of methoxypropylamine was added, accompanied by an increase in the stirring speed to 600 rpm. Mixing was continued for 15 minutes. 18.30 grams of Tolonate HDT LV™ (aliphatic polyisocyanate (hexamethylene diisocyanate trimer) supplied as a non volatile liquid by Rhodia), was added drop wise over a period of 15 minutes. Stirring was continued for an additional 30 minutes at 650 rpm, and the temperature of the reaction mixture kept below 40° C. Afterwards the reaction mixture was cooled to 30° C. at 450 rpm.

A drawdown of the modified polymer dispersion on glass revealed a clear and bit-free film. Solids content of the modified polymer dispersion was 40.8%, pH 8.6.

The rheology of the modified polymer dispersion was compared to that of the un-modified polymer dispersion Setaqua 6756 using a Physica Measuring device MC 200 SN 280754; FW 2.07 (Cone/Plate), Measuring system MK22/Ti/442.

| Shear stress | Viscosity (Pa · s) | |
| --- | --- | --- |
| (Pa) | Setaqua 6756 ™ | Example 1 |
| 1 | 0.65 | 2.54 |
| 10 | 0.63 | 2.07 |
| 100 | 0.45 | 1.21 |

Example 2

Acrylic Polymer Dispersion Modified with 3% Polyurea 2.a Synthesis of an Acrylic Polymer Dispersion According to EP1125949 A1

A two liter double jacketed glass reactor equipped with a two-blade stirrer, a condenser and inlets for addition of monomer pre-emulsions, initiator, and other auxiliaries, was charged with 417 g of demineralized water, 22.5 g of the n-dodecyl hemi-ester of maleic anhydride, 1.7 g of sodium hydrogen carbonate, and 0.1 g of a 25% aqueous ammonia solution. This mixture was heated to 70° C. under stirring.

In the mean time two mixtures were prepared in separate containers A and B by mixing the ingredients given in Table I.

TABLE I

|  | Mixture 1 container A | Mixture 2 container B |
|---|---|---|
| Demineralized water | 134 | 122 |
| n-Dodecyl hemi-ester of maleic anhydride | 8 | 7 |
| Sodium hydrogen carbonate | 2 | 2 |
| Ammonia (25% aqueous solution) | 0.85 | 0.35 |
| Diacetone acrylamide | 21 |  |
| Butyl methacrylate |  | 151 |
| Butyl acrylate | 285 |  |
| Methyl methacrylate | 28 | 168 |
| Dimetyl aminoethyl methacrylate |  | 13 |
| Methacrylic acid | 11 |  |
| Triallylcyanurate | 0.5 | 0.5 |

1.24 g of mixture 1 was taken from container A and added to the reactor. After mixing for 10 minutes a solution of 0.75 g of sodium persulphate in 7 g of demineralized water was added to the reactor. After the exothermic reaction had subsided, the monomer addition was started using the following procedure. Simultaneously the contents of container B were dosed into container A and the contents of container A were pumped into the reactor. The addition rate was controlled in order to empty both containers after 90 min. Container A was equipped with a stirrer to ensure that the contents were well mixed.

Simultaneously, to the monomer addition a solution of 1 g of sodium persulphate in 114 g of water was dosed into the reactor. During the monomer addition the temperature was allowed to rise to 85° C. After the additions had been completed, the reactor contents were kept at 85° C. for an additional 30 min. The batch was cooled to 65° C. and a solution of 0.9 g of tert-butyl hydroperoxide (70% aqueous solution) in 3 g of demineralized water was fed to the reactor. A solution of 0.4 g of sodium formaldehyde sulphoxylate in 5 g of demineralized water was then dosed into the reactor over a period of 15 min. After the addition was completed the batch was kept at 65° C. for another 30 min. Under stirring 13 g of adipic dihydrazide was dissolved into the contents of the reactor. To ensure proper solution, stirring and heating was continued for an additional 30 min. The batch was cooled to 30° C. and finally 0.3% Proxel AQ (available from Arch Chemicals) on dispersion was added to the reactor and the contents were filtered through an 80 μm Perlon filter-bag to remove any coagulum.

The resulting polymer dispersion had a particle size of 87 nm (Z average mean, Malvern Zetasizer) and a solids content of 42%. The pH of the dispersion was 8.4 and the viscosity was 0.41 Pa·s (at 23° C.).

2.b. Polyurea Modification of the Polymer Dispersion Obtained in Example 2.a

In a five liter reaction flask, 1840 grams of the acrylic polymer dispersion from example 2.a and 184 grams of demineralized water were heated to 35° C. while stirring at 200 rpm. 7.82 grams of methoxypropylamine were added to the flask and mixed during 15 minutes. The stirring speed was increased to 650-700 rpm. Over a period of 3 minutes, 22.49 grams of Desmodur VP LS 2032 (a water dispersible polyisocyanate based on hexamethylene diisocyanate, available from Bayer) were added. 9.20 grams of demineralized water were used to rinse the addition funnel. Stirring was continued for 30 minutes and the temperature was not allowed to rise above 40° C. The batch was cooled to 30° C. at a stirring rate of 200 rpm.

The solids content of the modified polymer dispersion was 40%, pH 8.6, particle size 111 nm (Z average mean, Malvern Zetasizer).

The rheology of the modified polymer dispersion was compared to that of the un-modified polymer dispersion from example 2.a as described above.

| Shear stress | Viscosity (Pa · s) | |
|---|---|---|
| (Pa) | Example 2.a | Example 2.b |
| 1.5 | 1.29 | 12.3 |
| 10 | 0.6 | 8 |
| 100 | <0.06 | 0.7 |

Example 3

Styrene Acrylic Dispersion Modified with 3% Polyurea 3.a Synthesis of a Styrene-Acrylic Polymer Dispersion.

A two liter double jacketed glass reactor equipped with a two-blade stirrer, a condenser and inlets for addition of monomer pre-emulsions, initiator, and other auxiliaries, was charged with 833 grams of demineralized water, 12 grams of Dextrol OC 7525™ (available from Dexter Chemicals) and 1 gram of ammonia (25% aqueous solution). Under a nitrogen flow the contents of the reactor were heated to 72° C. In the mean time two pre-emulsions were prepared. Monomer pre-emulsion A was prepared by mixing 263 grams of demineralized water, 4 grams of Dextrol OC 7525, 2 grams of ammonia (25% aqueous solution) and 693 grams of monomer mixture A (see table 2).

Monomer pre-emulsion B was prepared by mixing 239 grams of demineralized water, 4 grams of Dextrol OC 7525, 1 gram of ammonia (25% aqueous solution) and 679 grams of monomer mixture B (see table 2).

To the reactor 49 grams of pre-emulsion A was added along with an initiator solution consisting of 1 gram of ammonium persulphate in 14 grams of water. The temperature of the reaction mixture was allowed to rise to 79° C. After the exotherm had subsided, an initiator solution consisting of 2 grams of ammonium persulphate and 227 grams of demineralized water and pre-emulsion A was dosed into the reactor over a period of 150 minutes. Pre-emulsion B was dosed into the container holding pre-emulsion A over the same time. After dosing, 80 grams of demineralized water was used to rinse the containers holding the pre-emulsions. The batch was cooled to 65° C. A solution of 13 grams of ammonia (25% aqueous solution) in 20 grams of demineralized water was added over a period of 10 minutes followed by a solution of 2 grams of Tert. Butylhydroperoxide (70% aqueous solution) in 6 grams of water. The temperature was kept at 65° C. for 30 minutes. A solution of 1 gram of sodium formaldehyde sulphoxylate in 11 grams of demineralized water was dosed into the reactor over a period of 15 minutes. The temperature was kept at 65° C. for another 30 minutes. 25.9 grams of adipic dihydrazide was added to the reaction mixture and the temperature kept at 65° C. for 30 minutes. Afterwards the batch was cooled to a temperature below 40° C. 5 grams ammonia (25% aqueous solution) dissolved in 12 grams of demineralized water, followed by 5 grams of Proxel AQ™ (available from Arch Chemicals) was added. The contents of the reactor were filtered through a 100 μm GAF filter bag and stored in a suitable container.

TABLE 2 monomer compositions.

|  | monomer mixture (%) A | monomer mixture (%) B |
|---|---|---|
| diactone acrylamide | 6.1 | 0.0 |
| 2-ethyl hexyl acrylate | 64.4 | 6.6 |
| methyl methacrylate | 13.3 | 48.3 |
| methacrylic acid | 4.1 | 2.0 |
| styrene | 12.1 | 39.2 |
| Plex 6844-0 ™ (Evonik Rohm) | 0.0 | 3.9 |

The resulting styrene acrylic dispersion had a solids content of 44%, a pH of 8.5 and a particle size of 100 nm (Z average mean, Malvern Zetasizer).

3.b Polyurea Modification of Styrene-Acrylic Polymer Dispersion from Example 3.a.

In a 5 liter flask 1840 grams of the polymer dispersion from example 3.a and 184 grams of demineralized water were heated to 35° C. while stirring at 200 rpm.

7.82 grams of methoxypropylamine were added and mixed during 15 minutes at 650-700 rpm. 22.49 grams of Desmodur VPLS 2032 (a water dispersible polyisocyanate based on hexamethylene diisocyanate, available from Bayer) were added over a period of 3 minutes. 9.20 grams of demineralized water was used to rinse the funnel holding the isocyanate. Mixing was continued for 30 minutes. The temperature was not allowed to exceed 40° C. The reaction mixture was cooled to 30° C. and was poured into a storage container. The resulting product had a solids content of 41.4%, pH of 8.6 and a particle size of 110 nm (Z average mean, Malvern Zetasizer).

The rheology of the modified polymer dispersion was compared to that of the un-modified polymer dispersion from example 3.a as described above.

| Measuring system: MK24/Ti/102 | | |
|---|---|---|
| Shear stress | Viscosity (Pa · s) | |
| (Pa) | Example 3.a | Example 3.b |
| 1 | 0.02 | 307 |
| 10 | 0.08 | 1.68 |
| 100 | <0.03 | <0.06 |

Example 4

Acrylic Dispersion Modified with a Poly Urea Urethane as Described in European Patent Application 1 048 681 (Comparative)

To 147.7 grams of a commercially available carbonyl-functional acrylic polymer dispersion containing a dihydrazide crosslinker: Setaqua™ 6756, are added under stirring with a high speed impeller (1000 rpm) at ambient temperature 13.8 grams of demineralized water and 3.46 grams of a poly urea urethane as described in EP 1 048 681, hereby incorporated by reference in its entirety, commercially available as Byk 420 (a 52% solution in N-methylpyrrolidone, ex Byk Chemie). After the addition, stirring was continued for 5 minutes.

A draw down was made of the modified dispersion (150 μm wet film thickness). The film was hazy and contained a lot of gel particles.

Example 5

Waterborne Wood Stains

A premix was prepared using the ingredients given in table 3. Mixing was effected at room temperature using a Dispermat® or propeller stirrer.

TABLE 3

Premix.

| Ingredient | Part by weight | |
|---|---|---|
| Water | 320.00 | |
| Mergal 710 (ex Troy Corporation) | 8.00 | Biocide |
| Propylene glycol | 15.00 | Co-solvent |
| BYK 345 (ex Byk Chemie) | 2.00 | Wetting agent |
| Tego Foamex 810 (ex Tego) | 2.00 | Defoaming agent |
| 2-Amino-2-methyl-1-propanol (90% aqueous solution) | 3.00 | Neutralizing amine |
| Dipropylene glycol n-butyl ether | 20.00 | Co-solvent |

31.5 grams of the polyurea modified acrylic dispersions from examples 1, 2 and 3 were diluted with demineralized water to a solids content of 36.4%, were mixed with 18.5 grams of premix using a Dispermat®; 5 minutes mixing at 1000 rpm following addition. In a similar way a wood stain was prepared based on Setaqua 6756™. The viscosity data are given below:

| Measuring system: MK 22/TI/442 | | | |
|---|---|---|---|
| | Viscosity (Pa · s) | | Wood stain based |
| Shear stress (Pa) | Wood stain based on Setaqua 6756 | Wood stain based on Example 1 | on Example 4 (comparative) |
| 1 | 0.21 | 2.35 | 3.49 |
| 10 | 0.21 | 0.66 | 0.66 |
| 100 | 0.20 | 0.33 | 0.27 |
| 1000 | 0.15 | 0.18 | 0.14 |

The woodstains were applied onto glass plates using a film applicator. Wet film thickness was 150 μm. The stains based on Setaqua™ 6756 and the dispersion from example 1 gave clear films. The wood stain based on example 4 was hazy and contained gel particles. The resistance against sagging of the wood stains was determined using a multi-notch applicator according to ASTM D4400-99 (2007) hereby incorporated by reference in its entirety. The results are given below.

| Wood stain based on | Setaqua 6756 | Example 1 | Example 4 (comparative) |
|---|---|---|---|
| Sag resistance (μm) | <75 | 175 | 75 |

These results illustrate the superior anti-sagging properties when the polyurea modification according to the invention is used.

Thus, the invention has been described by reference to certain embodiments discussed above. It will be recognized that these embodiments are susceptible to various modifications and alternative forms well known to those of skill in the art.

Further modifications in addition to those described above may be made to the techniques described herein without departing from the spirit and scope of the invention. Accordingly, although specific embodiments have been described, these are examples only and are not limiting upon the scope of the invention.

What is claimed is:

1. A process for the preparation of a thixotropic aqueous coating composition
comprising the steps of:
i) providing an aqueous binder system comprising a dispersion of a polymer binder and a carbonyl-hydrazide crosslinking system; and
ii) reacting in the aqueous binder system an ether amine with a tris(isocyanate) isocyanurate to form a polyurea sag control agent.

2. The process of claim 1 wherein the polymer binder comprises at least one of a carbonyl functional group and a hydrazide functional group, and optionally the aqueous binder system comprises a crosslinker having at least one of a carbonyl functional group and a hydrazide functional group for reaction with the functional groups of the polymer binder to give crosslinking.

3. The process of claim 1 wherein the ether amine is selected from a group consisting of (cyclo)alkoxy(cyclo) alkyl monoamines, mono(cyclo)alkoxy arene amines, poly(cyclo)alkoxy arene amines, areneoxy(cyclo)alkoxy amines, aryloxy(cyclo)alkyl amines, areneoxyarene amines, and aryloxyaryl amines.

4. The process of claim 1 wherein the tris(isocyanate) isocyanurate has the chemical formula of trimeric derivatives of one or more diisocyanates containing 5-14 carbon atoms.

5. The process of claim 4, wherein the tris(isocyanate) isocyanurate has the chemical formula of the trimeric derivative of hexamethylene diisocyanate.

6. The process of claim 1 wherein the tris(isocyanate) isocyanurate has the
general formula:

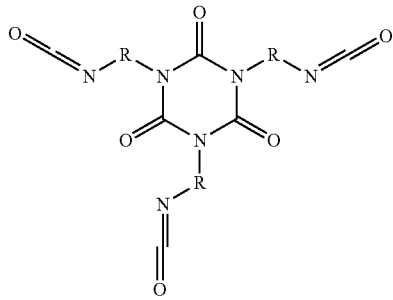

wherein R is alkyl.

7. The process of claim 1 wherein the tris(isocyanate) isocyanurate comprises hydrophilic groups.

8. The process of claim 1 wherein the reaction of the ether amine with the tris(isocyanate) isocyanurate is carried out in the range of 5 to 80° C.

9. The process of claim 1 wherein the aqueous binder system comprises a polymer binder having carbonyl functional groups and a crosslinker having hydrazide functional groups.

10. The process of claim 1 wherein the polymer binder has a number average molecular weight in the range of 500 and 250000.

11. The process of claim 1, wherein the polymeric binder has a number average molecular weight in the range of 2000 to 20000.

12. An aqueous coating composition obtained by the process of claim 1, comprising:
a) an aqueous binder system comprising a dispersion of a polymer binder and a carbonyl and hydrazide crosslinking system;
b) a polyurea sag control agent; and
c) water;
wherein the polyurea sag control agent is a polyurea adduct of an ether amine and a tris(isocyanate) isocyanurate.

13. The aqueous coating composition according to claim 12 comprising 0.01% to
30% by weight of the polyurea sag control agent.

14. The aqueous coating composition according to claim 12, comprising 0.15% to 3% by weight of the polyurea sag control agent.

15. The aqueous coating composition according to claim 12, wherein the coating composition is suitable for implementation in at least one of a paint formulation and a wood stain formulation.

16. A paint formulation comprising an aqueous coating composition comprising:
a) an aqueous binder system comprising a dispersion of a polymer binder and a carbonyl and hydrazide crosslinking system;
b) a polyurea sag control agent that is a polyurea adduct of an ether amine and
a tris(isocyanate) isocyanurate;
c) water;
d) a pigment; and
e) optionally at least one of coating additives and organic solvents.

17. The process of claim 6 wherein the tris(isocyanate) isocyanurate has the chemical formula of trimeric derivatives of one or more diisocyanates selected from: methylene diisocyanate, trimethylene diisocyanate, tetramethylene diisocyanate, hexamethylene diisocyanate, cyclohexyl-1,4-diisocyanate, dicyclohexylmethane-4,4'-diisocyanate, dicyclohexyldimethylmethane-4,4'-diisocyanate, 2,4-toluene diisocyanate, 2,6-toluene diisocyanate, diphenylmethane-4,4'-diisocyanate, 3-isocyanatomethyl-3,5,5-trimethylcyclohexylisocyanate (isophorone diisocyanate).

* * * * *